US005537526A

United States Patent [19]
Anderson et al.

[11] Patent Number: 5,537,526
[45] Date of Patent: Jul. 16, 1996

[54] METHOD AND APPARATUS FOR PROCESSING A DISPLAY DOCUMENT UTILIZING A SYSTEM LEVEL DOCUMENT FRAMEWORK

[75] Inventors: David R. Anderson, Cupertino; Jack H. Palevich, Sunnyvale; Arnold Schaeffer, Belmont; Larry S. Rosenstein, Santa Clara; Ryoji Watanabe, Cupertino, all of Calif.

[73] Assignee: Taugent, Inc., Cupertino

[21] Appl. No.: 151,335

[22] Filed: Nov. 12, 1993

[51] Int. Cl.⁶ .................................................. G06F 15/00
[52] U.S. Cl. ........................................................... 395/148
[58] Field of Search ............................... 395/145, 146, 395/147, 148, 155, 161

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |

OTHER PUBLICATIONS

N. M. Delisle & M. P. Schwartz, "Contexts–A Partioning Concept for Hypertext", Apr. 1987, pp. 168–186.
Microsoft Windows (Trademark of Microsoft Cor.), 1992, pp. 26–27.
Computer, V.21(1), Jan. 1988, Long Beach, US, pp. 81–96, Yankelovich et al. "Intermedia: The Concept and Construction of a Seamless Information Environment".

Communications of the Association for Computing Machinery, V.35(1), Jan. 1992, New York, USS, pp. 36 . 51, Haan et al. "IRIS Hypermedia Services".

Communications of the Association for Computing Machinery, V.33(3), Mar. 1990, New York US, pp. 296–310, Nielsen "The Art of Navigating Through Hypertext".

InformationsTechnik IT, V.32(4), Aug. 1990, Munchen BR, pp. 231–240, Schnell et al. "Konzeptionelle Ansatzur fur kooperative Applikationen".

Proceedings of the Conference on Computer–Supported Cooperative Work, CSCW 92, Nov. 4, 1992, Toronto, CA, pp. 138–146, Haake et al. "Supporting Collaborative Writing of Hyperdocuments in SEPIA".

*Primary Examiner*—Heather R. Herndon
*Assistant Examiner*—Cliff N. Vo
*Attorney, Agent, or Firm*—Keith Stephens

[57] ABSTRACT

An object-oriented compound document architecture provides system level support for document processing features. The object-oriented compound document framework supports a variety of document processing functions. The framework provides system level support of collaboration, linking, eternal undo, and content based retrieval, among other things. System level support is provided for document changes, annotation through model and linking, anchors, model hierarchies, enhanced copy and pasting, command objects, and a generic retrieval framework.

39 Claims, 13 Drawing Sheets

0. DOCUMENT(TPAGESETUPMODEL)
1. TALIGENT TEXT (TTEXTMODEL)
2. TALIGENTLOGO(TGRAPHICMODEL)
3. DOCUMENT BODY (TTEXTMODEL)
4. HANDSHAKE ILLUSTRATION (TGRAPHICMODEL)
5. TABLE (TTABLEMODEL)

5,537,526

METHOD AND APPARATUS FOR PROCESSING A DISPLAY DOCUMENT UTILIZING A SYSTEM LEVEL DOCUMENT FRAMEWORK

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to computer systems, and more particularly to a method and system for object-oriented compound document processing.

BACKGROUND OF THE INVENTION

Document processing has virtually revolutionized the way society generates paper. Typical prior art document processing systems run on top of operating systems, such as DOS or OS/2. More recently, these document processing systems have been designed to run in a Windows environment. Many of these document processing systems are commercially available.

While these document processing systems have vastly improved the ability to process documents and text, there is great inconsistency among document processors with respect to the particular methodologies of these processing. The result of these inconsistencies creates problems for both application developers and users of the applications.

Application developers must continuously "reinvent the wheel" when creating a new document processor. While operating systems and interface programs provide some tools which may be used, the great majority of the design process for a particular document processor is directed toward creating a group of processing modules which cooperate to allow the user to process documents. Application developers often design processing modules which have already been developed by another company. This requires great duplication of effort, and requires each developer to deal with the details of how to implement various desired functions.

Application users run into other problems. While particular functions may be present in one application, they may be lacking in another. Or a function available in one application may be slightly varied in another, either in use or in performance. For example, a function in application A may require certain user interaction and input to activate the function, while a similar function in application B may require a slightly varied, or totally different, user interaction and input.

SUMMARY OF THE INVENTION

It is an object of the present invention to provide a document processing system in which object-oriented frameworks are utilized to implement particular document processing techniques, including an object-oriented compound document system. These and other objects of the present invention are realized by a document flamework which supports at the system level a variety of compound document processing functions. The framework provides system level support of collaboration, linking, eternal undo, and content based retrieval. These and other objects are carried out by system level support of document changes, annotation through model and linking, anchors, model hierarchies, enhanced copy and pasting, command objects, and a generic retrieval framework.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The history of object-oriented programming and the developments of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object oriented systems, the reader is referred to "Object Oriented Design With Applications" by Grady Booch, ISBN 0-8053-0091-0 (1991).

While many object oriented systems are designed to operate on top of a basic operating system performing rudimentary input and output, the present system is used to provide system level support for particular features.

Figure 1:
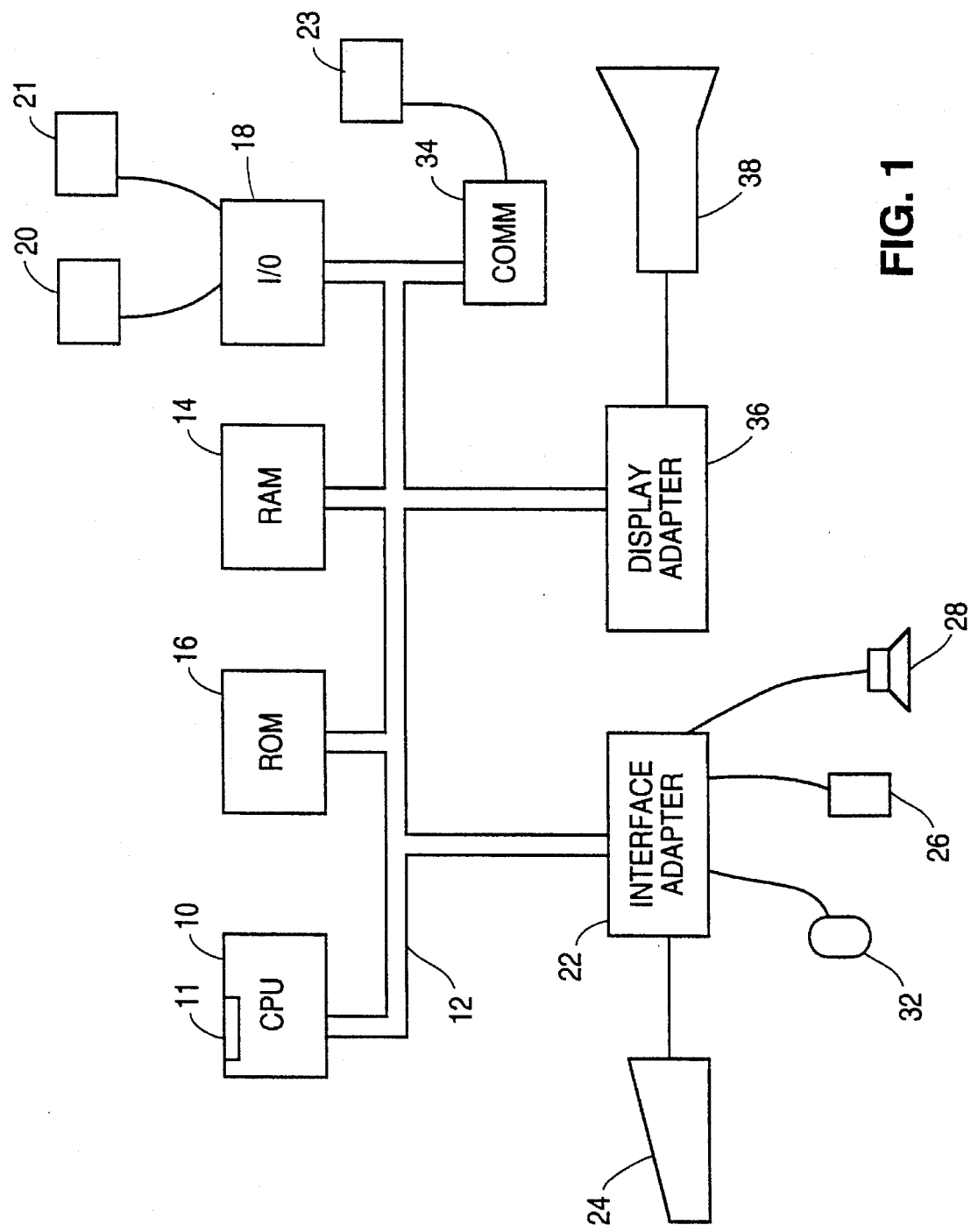
FIG. 1 is a block diagram of a personal computer system in accordance with a preferred embodiment of the invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, and a number of other units interconnected via a system bus 12. The computer shown in FIG. 1 includes a Read Only Memory (ROM) 16, a Random Access Memory (RAM) 14, an I/O adapter 18 for connecting peripheral devices such as disk units 20 and other I/O peripherals represented by 21 to the system bus 12, a user interface adapter 22 for connecting a keyboard 24, a mouse 32, a speaker 28, a microphone 26, and/or other user interface devices such as a touch screen device (not shown) to the bus 12, a communication adapter 34 for connecting the workstation to a data processing network represented by 23. A display adapter 36 for connecting the bus to a display device 38. The workstation has resident thereon an operating system such as the Apple System 7® operating system.

The main goal of the document framework disclosed herein is to raise the base level of applications by enabling several new features at the system level. In addition, the lack of system support for these features limits their implementation. For example, there are applications that allow users to annotate static representations (pictures) of any document, but not the "live" document itself. The content-based retrieval applications have trouble accessing the contents of document because each application has a custom file format. Also, once the application finds a document, it is difficult to do anything with it. There's no system-level support for opening the document, for example. The document framework also includes a number of higher-level capabilities, such as annotation support, which are built upon these basic services. To the extent possible, the document framework does not specify any policy or user interface decisions. These details will be provided by the particular applications using the document framework.

Collaboration

Screen sharing is one popular type of collaboration on the Macintosh, because it is relatively easy to implement and can be put to many uses. Its main disadvantages are that some applications draw directly to the screen (complicating the implementation) and the large bandwidth required to transmit all drawing operations from one machine to another. Also, it is very restrictive, since it is based on all collaborators viewing the document in exactly the same way.

Screen sharing is one kind of simultaneous, real-time collaboration. The document framework provides support for a different kind of simultaneous, realtime collaboration. This operates at the level of changes to the document, rather than changes to the screen, which will be more efficient because the amount of data needed to specify a document change is usually less than the amount needed to update the screen.

It is also useful to have asynchronous (i.e., non real-time) collaboration. One form of this is the ability to annotate a document. The document framework provides low-level support for annotations through its model and linking mechanisms (described below).

Hypermedia Linking

Figure 2:
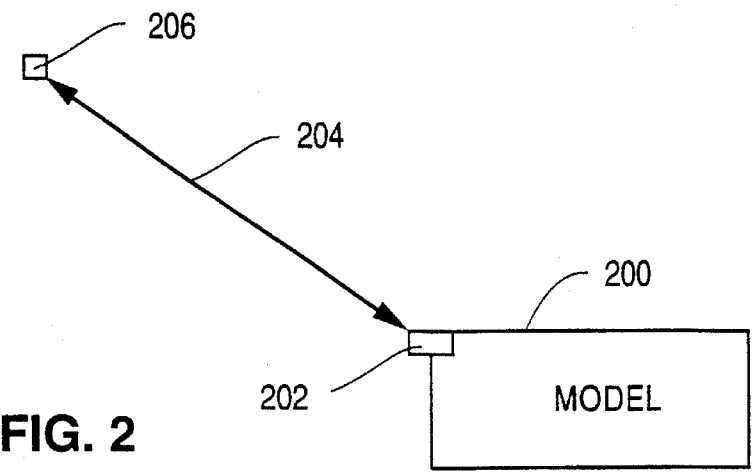
FIG. 2 is a block diagram of a link, anchors, and a model.

FIG. 2 shows an illustration of the present invention. The blocks represent both the apparatus and the methods involved in the system. As shown in FIG. 2, in the document framework, a link 204 is a bi-directional connection between anchors 202 and 206. The meaning of an anchor is application-specific, but in most cases an anchor identifies a sticky selection. An anchor is sticky in that it always refers to the same data regardless of the user's editing changes. For example, if the anchor refers to a word within a text block, it always refers to that word, even if the text around it changes. Anchors are associated with a particular encapsulated block of data (called a model) 200. Each kind of data in the system is represented as a specific subclass of TModel. The abstract base class, TModel, defines generic protocol to enable other models to embed, display, and manipulate this data as a "black box." For example, an application can ask the model to create a presentation (view) of the data. These presentations range from a small thumbnail to a fully editable presentation. There is also protocol for accessing the anchors associated with the model's data and for accessing other models embedded within it. A document's data is represented by a hierarchy of models, with a single model at the root called the "root model."

Once the user creates a link, the user can operate upon it. First, the user can navigate from one end of the link to the other. In general, this involves opening the document containing the target anchor, scrolling the anchor into view, and highlighting the corresponding selection. Applications can change this behavior; for example, navigating to a sound document may simply play the sound without opening the document. It is also possible to transfer data across the link in either direction. The semantics of transferring data is (roughly) equivalent to copying the source data, navigating to the destination anchor, and replacing the existing data with the transferred data. It makes no difference to the document framework whether the data is pushed or pulled through the link (i.e., whether the source or destination initiates the transfer).

The document framework also allows one application to send an arbitrary command across a link. This will allow cooperating applications to implement custom features using the same basic linking mechanism. The straightforward use for the document framework's low-level linking mechanism is to allow users to create links between documents, navigate those links, transfer data across them, etc. This isn't the only use for links, however. Links will also be used to implement other application features. In these features, the fact that links are created and manipulated will be transparent to the user.

For example, the system-wide annotation facility uses links to associate an annotation with the part of the base document to which it refers. The system can position a posted note icon (representing the annotation) near the part of the document to which it refers. In addition, if the annotation contains a suggested change to the document, it is possible for the author to "accept" the suggestion and have the system automatically transfer data across the link from the annotation to the document.

Another user-transparent use of linking would be to implement a function performed by the Edition Manager of System 7. The user could publish part of a drawing and subscribe to that data in a word processing document. Internally, the system would create a link between the documents, and perhaps attach an attribute to the link that indicates the nature of the link (e.g., which end is the source of the data). The existence of the link may be transparent to the user.

Changes to the drawing are sent across the link to the word processing document. The document framework does not restrict which end of the link initiates this transfer. The user can navigate from the destination to the source of the data (from the word processing document to the drawing document). The document framework also supports navigating in the opposite direction because all links are bi-directional.

The document framework's models also improve the way simple copy and paste works. On the Macintosh, an application handles a paste command in three different ways, depending on the type of the data model in the Clipboard. (1) The document can fully understand the pasted data, and the data becomes a first-class part of the document. (2) The receiving document can display the incoming data but not manipulate it. A typical example is a picture pasted into a text document. In this case, the incoming data can be displayed but not edited. (3) The incoming data type isn't understood by the receiving document. Here, the paste command can't be completed, and should be disabled.

If the data can't be absorbed, then it can be embedded in the receiving document in the form of a model. Because models support generic protocol for creating editable presentations of the data, embedded data is not "dead" as is true on the Macintosh. Instead, the user can open up an embedded model and view or edit the data it contains. This capability is similar to that provided by HP's New Wave system or Microsoft's OLE specification. An important difference is that the object-oriented document framework makes it easier for a developer to implement a new data type. Finally, if an application supports embedded models, then it can paste every type of data. The paste command would never be disabled as long as the Clipboard wasn't empty.

Eternal Undo

In most Macintosh applications, the undo command is precious, since only the last change can be undone. The document framework uses the same kind of command objects as MacApp, but saves as many command objects as possible.

This decision has several benefits. First, it isn't as important to be choosy about what commands are undoable. For example, in existing Macintosh applications, changes to the selection are not undoable, even though some selections can be difficult to create. In a drawing program, the user can spend much time selecting the right combination of shapes and lose everything with an extra click. If the system supports only one level of undo, then it is unwise to save a selection change if it means forgetting about the last Cut command, for example. With multiple levels of undo, it is feasible to save selection changes.

Another benefit of using command objects is increased reliability. If every command is saved, then it is possible to replay those commands in the event of an application or system crash. The document framework uses concurrency control and recovery classes to save command objects in a robust manner. In the event of a crash, the user should not lose more than the last couple of commands. With multi-level undo comes the added burden of providing a good way to visualize and navigate the list of commands. This is especially true if selection changes are included, because it will be easy for the user to create hundreds of commands.

Figure 3:
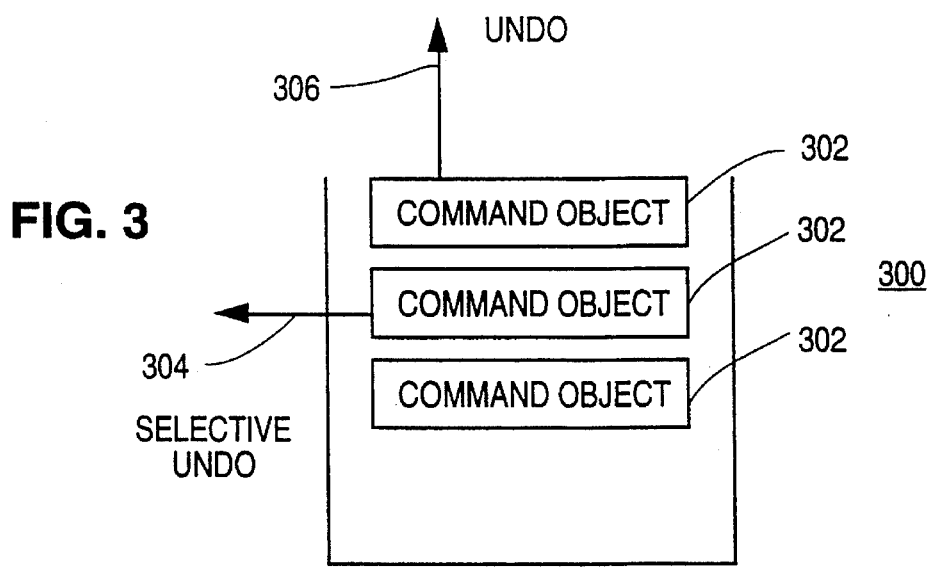
FIG. 3 is a block diagram representing the functions associated with undo.

FIG. 3 shows The document framework linear list 300 of command objects 302, which can be likened to a stack. There are many other ways in which the undo processing could be carried out. This means that undo 306 returns the document to a previous state. It is also contemplated that the user can selectively undo commands 304 (i.e., undo a Cut command but keep all subsequent commands intact). It should be remembered that commands are dependent on one another. A command that copies a shape is dependent on the command that first created the shape. These dependencies would complicate the user interface to undo, as well as the underlying implementation.

A good solution is to integrate the undo and scripting mechanisms, for example to automatically create a script of everything that is done. The user can then edit the script to remove arbitrary commands, rearrange commands, etc. and execute the script. This gives users the maximum flexibility and control.

Content-based Retrieval

Increasingly, users have more and more information available on their computers. Local hard disks are getting larger, and there are many CD-ROMs available that contain hundreds of megabytes of data. It is impossible to browse through this data without some assistance from the system. In the Macintosh, the standard tool used to be Find File, which located documents based on their names. System 7 provides a Find command that is integrated within the Finder. Third party developers also provide tools that go beyond Find File and search for documents based on their content, but which aren't well-integrated with the system.

It is important that these retrieval tools be integrated into the system. There's little point in locating documents if the user can't do anything with them. The third party content-based retrieval tools on the Macintosh get no system support in examining the contents of the document, or even opening the document with the appropriate application.

Figure 4:
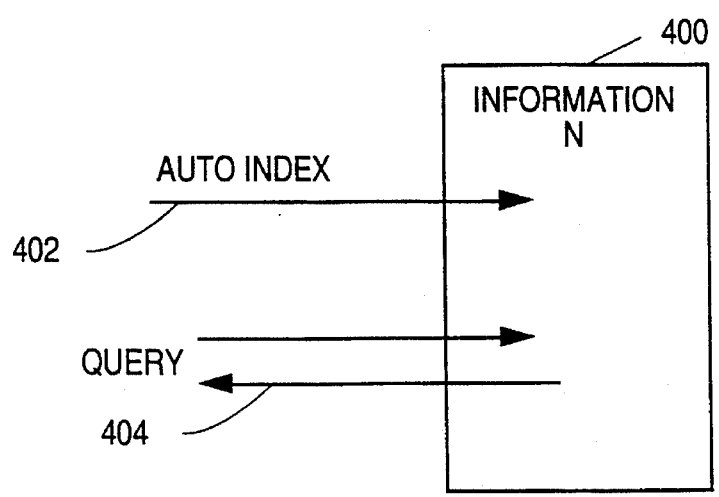
FIG. 4 is a diagram demonstrating the system level indexing and query processing features of the present invention.

FIG. 4 shows the generic retrieval framework of The document framework from a source of information 400. The framework handles both indexing 402 and queries 404. Although many future operating systems will deliver with a default indexing and query package, users will still want the ability to plug in new search packages into the basic framework. The point of designing a framework is so that the background indexing mechanism and query user interface are the same regardless of the underlying retrieval technology.

The framework will provide for automatic, background indexing of documents when they are added to a volume or changed. A retrieval system is worthless if only some of the documents are indexed, and it is unreasonable to place this burden on the user. A generic query front-end will allow a user to install a new retrieval engine and not have to learn a new front-end.

Classes, The Developer's View

This section contains class and member function descriptions. Certain conventions are followed. All classes have virtual destructors. If the destructor does anything more than release storage, it is discussed; otherwise, nothing is said. Methods inherited from MCollectible (FIG. 5, element 500), such as streaming operators, are not discussed here. Many of the classes have getters and setters which simply do field accesses.

Object Surrogates

Several objects in the document framework provide object surrogates, which act as compact, address space independent references to the real object. This use of surrogates can be described as "Explicit master and surrogates". In a few cases, surrogates and real objects can be used interchangeably, but in most cases the surrogate serves as a "key" for finding the real object. In all cases the relationship between the surrogate and real object is defined by a common abstract base class. The abstract base class provides the address space independent identification for the object and implements the protocol for comparison between objects (IsEqual). This allows a surrogate to be compared directly against a real object and used as a key into a set of real objects for lookup. Surrogate objects provide a constructor which will create a surrogate from a real object allowing easy creation of surrogates.

For example, it is necessary for TModelSelections to identify TModel objects in an address space independent manner to allow commands to access data in multiple collaborator's address spaces. TModel and TModelSurrogate both derive from the common base class TAbstractModel. TAbstractModel provides the address space independent identification of the object and implements the protocol for comparison between objects. TModel provides static member functions for looking-up the real model from a surrogate. When a selection is streamed, it streams only a surrogate for the model to which it refers. When the command attempts to access the data through the selection, the real model is looked up using the surrogate to provide the command access to the real model data.

Data Representation

Figure 5:
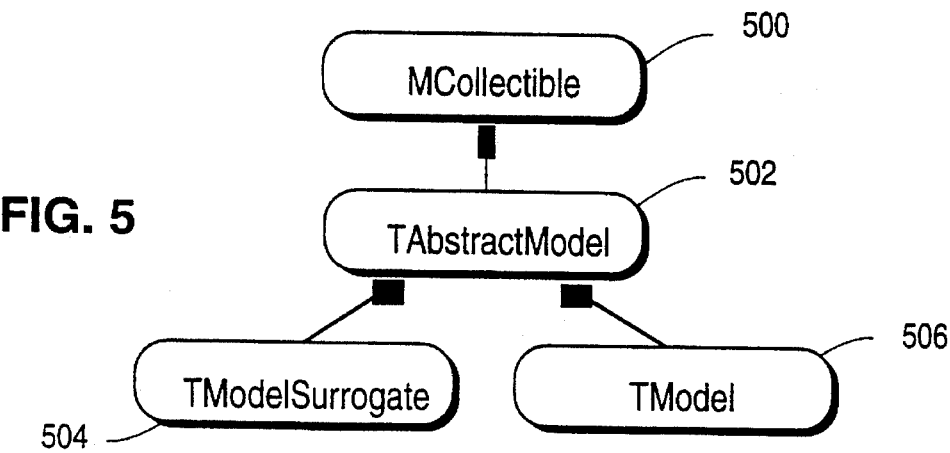
FIG. 5 is a block diagram of class representation in accordance with the present invention.

FIG. 5 shows Representation classes. The abstract base class that encapsulates the data for a particular data type is TModel 506. Derived classes of TModel 506 are the containers for "document" data. They provide type specific protocol for accessing and modifying the data contained in the model. They must also override generic protocol that supports embedding other models and for being embedded in other models. This mostly involves overriding protocol for creating selections and user interfaces on the data.

TModel objects 506 also provide notification of changes to the contained data to interested objects (typically presentations). Notification could be provided using a standard notification facility of the underlying system, if the system has such notification available. See the "Data Presentation" section for details on model notification.

The class TModelSurrogate 504 provides a lightweight stand-in or "name" for an actual TModel 506. It does not actually contain the data, only the real model does that, but it does provide protocol for a subset of the behavior supported by TModel. Specifically, the behavior necessary to appear and operate within the "Workspace". The behavior which TModelSurrogate 506 and TModel 506 share is defined by their common base class TAbstractModel 502.

Compound Document Structure

Figure 6:
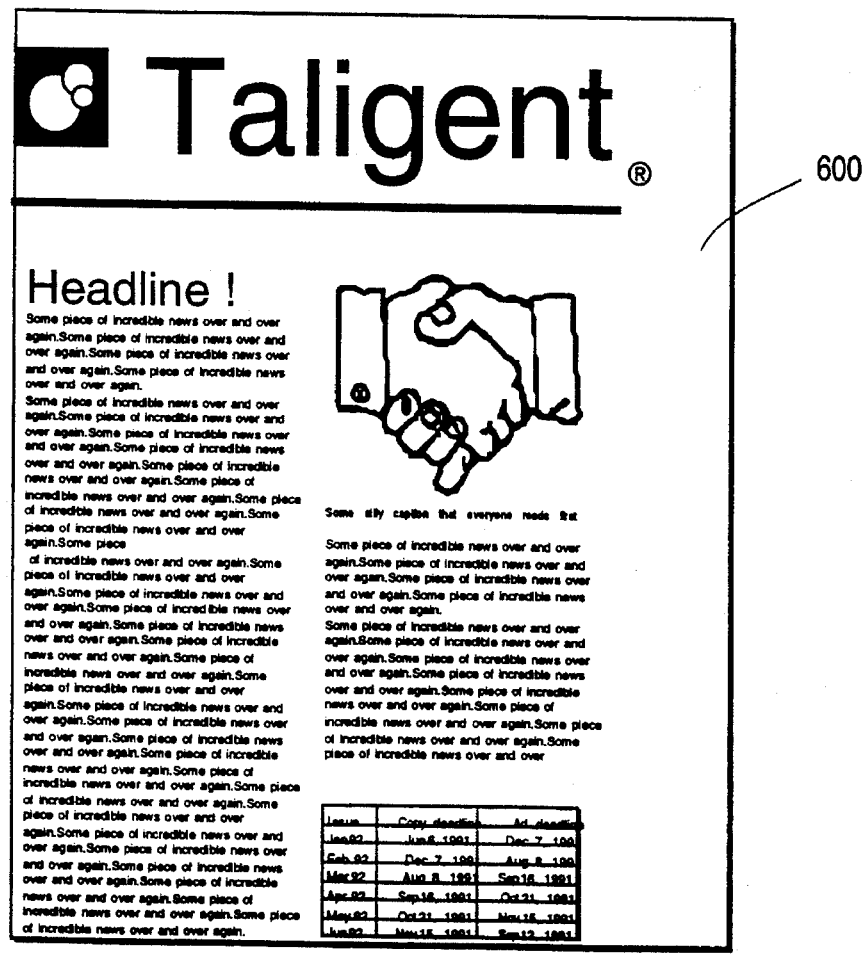
FIG. 6 is a diagram of a typical document which may be made using the present invention.

A document, such as shown by element 600 in FIG. 6, can contain many models which can be of many different classes. The basic structure of the document is a hierarchy of models which reflects the containership hierarchy of the document. A single model exists at the root of the hierarchy and is referred to as the "root model." Each model in the hierarchy may be a container for other models embedded within. A container model refers to its embedded models with model surrogates. C++ pointers must not be used because the embedded models may be filed using separate contexts from the container and are not necessarily in memory with the container. By accessing a model through a surrogate it will automatically be filed in if not already in memory. Optionally, the embedded document can be a directed acyclic graph. Multi-column text can be implemented this way; the individual columns of text were going to be models that all embedded a single shared text-flow model. Also, each model can be locked independently, providing more potential concurrency at the cost of more complexity.

"The Standard Example" shown in FIG. 6 illustrates a specific model hierarchy. Each model in the hierarchy which has a presentation included in the document has an associated TUserInterface (which is itself a model containing user interface objects). The TUserInterface for a particular model is managed by that model and is accessible only through that model. Models which are not viewed directly, but rather through another "presentation model", would not have an associated TUserInterface. For example, a TTableModel which was viewed only through a TGraphModel as a scatter plot, would not have a TUserInterface, while the TGraphModel would, since it is providing a presentation to the user.

Figure 7:
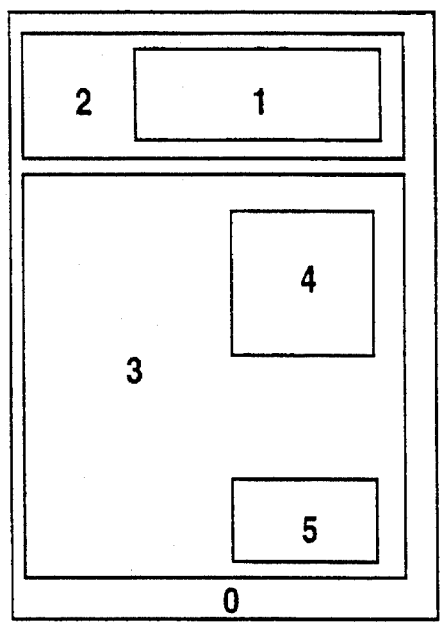
FIG. 7 is a diagram showing the hierarchical structure of the document shown in FIG. 6.
Figure 7:
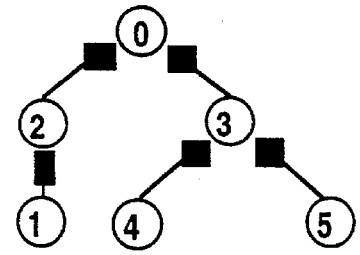

FIG. 7 demonstrates the hierarchical nature of the document of FIG. 6. In particular, sections 0–5 represent various types of information which may be embedded within other types of information. For example, Section 1 is the Taligent® text, which is embedded within the Taligent® logo, which is shown by Section 2. The lower right corner of FIG. 7 shows the hierarchical structure of the document of FIG. 6.

Data Types

The compound document architecture supports the seamless integration of many data types. These may include, but are not limited to, voice, graphics, bit-mapped images, pictures, tables, video, text, financial data, files, and program components. Virtually any visible or audible data type may be incorporated into the compound document in a seamless manner.

Managing Embedded Models

It is up to a derived class of TModel to provide an implementation to manage any embedded models it contains. TModel does not provide an implementation for this because it is extremely data dependent as to how the embedded models fit into the container's data structures. The document framework does include a TContainerModel that provides an implementation for simplistic embedding in which the embedded model presentations simply "float" over the containing presentation.

Copying, Streaming and Filing

Models which are embedded in another model are considered part of the containing model's data for purposes of copying and streaming. When a model is copied, streamed or filed, the embedded models it contains must be handled appropriately. TModel provides default implementations which make the handling of embedded models straightforward for these cases.

Streaming

The standard streaming operators (operator>>=and operator<<=) provided by TModel stream all data owned by TModel, including anchors and links. These streaming operators also take care of streaming any embedded models contained within the model being streamed. A derived class overrides these operators to stream its own data. If the model contains embedded models, only the surrogates for those models need to be streamed. The inherited streaming operators take care of streaming the real embedded models. For models which file their data by streaming, these methods may be identical to the filing methods. In such cases, it is usually desirable to create private helper functions which can be called by both the streaming operators and the filing methods.

Copying

When copying an entire model, or copying selected data from the model, the embedded models must be copied by the container. This is easily accomplished by using the "CopyModel" method of the TModelSurrogate for the embedded model. This method copies the surrogate and real model providing a new consistent model/surrogate pair.

Filing

When filing a model, its embedded models must also be filed. The embedded models must be filed independently from the container to allow customization of storage for the embedded models. When a model is asked to file its data in FileOutData(), it only files surrogates for any embedded models which it contains. The embedded models are filed automatically by the document framework. The filed surrogates are read back in FileInData(), and may be used to access the real model. All dirty models in a document are always filed out together. This simplifies the handling of the Roll-Forward log. Models are individually filed in when requested from model surrogates.

When a new model is added to the document it must be given the opportunity to create a new store for itself. The method CreateModelStore() is called passing in the document root model's store. If this store is acceptable to the model no new store is created. Otherwise, the embedded model will create a new store to use for its storage requirements. The actual creation of the store is done in a lazy fashion, so that models created in memory for temporary use that do not require a store will not create one.

When a model is removed from the document it must be deleted from both memory and storage. Deleting a model will delete the model from memory and from store. If the model is to be deleted from memory only the method TModel::DeleteFromMemoryOnly() can be used rather than calling delete.

Concurrency Control

A single monitor protects all the data in a document. This monitor is entered by creating a TModelEntry object on the stack.

Attributes

TModel provides an extensible interface and implementation for attaching attributes to models. The attributes are inheritable via the model hierarchy. That is, a model can inherit attributes from its ancestors. TModel provides support for looking up attributes on a specific selection in a model and for including or excluding ancestors from the lookup. Attributes are maintained in a simple attribute group and provides its own inheritance support rather than using the TInheritableAttributeGroup because all models in the hierarchy are not necessarily in memory at one time, and this behavior is not supported by TInheritableAttributeGroup.

TAbstractModel

TAbstractModel is the base class for TModel and TModelSurrogate. It provides the protocol which is common to both of these classes and provides the common base class between the real and surrogate classes as described in the "Object Surrogates" section of this document. TAbstractModel is an abstract base class. It is only instantiated as part of a derived class. The following methods provide access to the model's storage: 1) SetModelStoreReference, 2) AdoptModelStoreReference, 3) CopyModelStoreReference, 4) GetModelStore. TModel and TModelSurrogate are the only classes which derive from TAbstractModel. TAbstractModel is abstract and therefore is always created and deleted as part of a derived class. Any data created by TAbstractModel as part of its implementation is managed by the class.

TModelSurrogate

TModel Surrogate is a lightweight "stand-in" or "name" for a TModel which provides full addressability of the real model in storage. Any number of TModelSurrogates may exist for a single TModel. TModelSurrogate also serves as the address-space independent specifier of a TModel for purposes of collaboration. TModel Surrogate is a concrete class and may be freely instantiated and destroyed. TModelSurrogate provides concrete implementations for all of the abstract functions of TAbstractModel. The following methods support access to and management of the real model represented by this surrogate: 1) GetModel, 2) CopyModel, 3) DeleteModel. The following methods provide access to the model's anchors: 1) CopyAnchor, 2) CreateAnchorIterator. The following methods support presentation of the model represented by the surrogate. These presentations are static. They do not reflect changes to the content of the real model. 1) CreateIcon, 2) CreateThumbnail.

TModel

Figure 8:
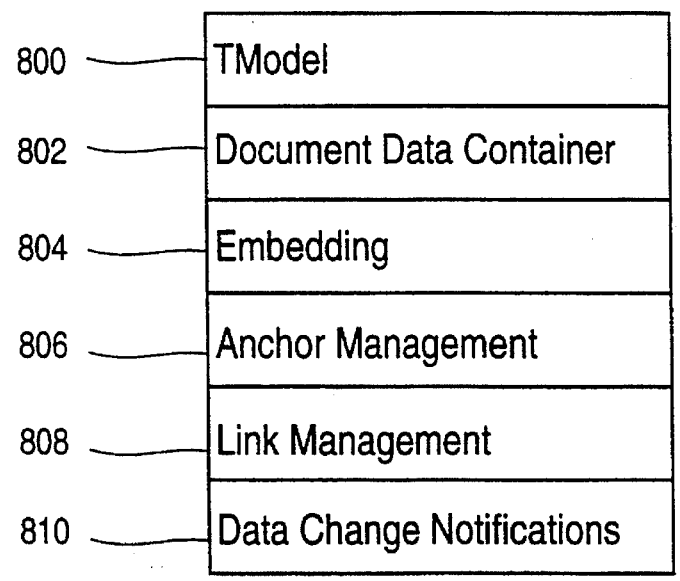
FIG. 8 is a diagram of the general characteristics of TModel.

FIG. 8 demonstrates TModel 800, which is the container for all document data 802, including anchors and links and serves as the unit of data exchange for cut/copy/paste. It provides protocol that supports embedding 804 the data in other alien data models and/or embedding alien data models within. The base class TModel provides the implementation for managing a model's anchors 806 and links 808. Subclasses provide the protocol and implementation for accessing and managing the type-specific data. Additionally, the subclass must implement the base class protocol for creating a user interface, selections and accessing embedded models. TModel derives from MDelegatingNotifier and therefore can be connected to for notification on changes to the model's data 810. All models in a TDocument share the TModel class notifier and delegate all calls to that notifier. Several member functions support management of a model's user interface model. Subclasses must override CreateUserInterface to create the appropriate user interface for this model. In the future the choice of interface could be determined from a user preference. The member functions are: 1) CreateUserInterface, 2) AdoptUserInterface, 3) GetUserInterface, 4) GetUserInterfaceSurrogate. Numerous member functions also support accessing and modifying a model's set of anchors and links, as well as accessing and modifying attributes associated with the models.

DATA PRESENTATION

Notification Classes

Data contained in a TModel is of little interest unless it can by viewed and/or modified by the user. Although the document framework does not directly provide the classes necessary to implement data presentations, the document framework does provide support for managing presentations on models. This section deals primarily with notification, since this is the extent of presentation support provided directly by the document framework. For example, all other presentation support could be provided by an object-oriented User Interface Toolbox.

User Interface Management

The document framework provides support for managing a model's user interface. Protocol is provided by TModel for creating, storing and retrieving a model's associated user interface. A client of TModel can ask the model for its user interface. In turn the client can ask the user interface for an Embedded, or Window presentation. The document flamework provides no support for the contents of a user interface, only for managing its access and storage. See the section, "Data Representation" for a description of this facility of TModel.

Notification

Figure 9:
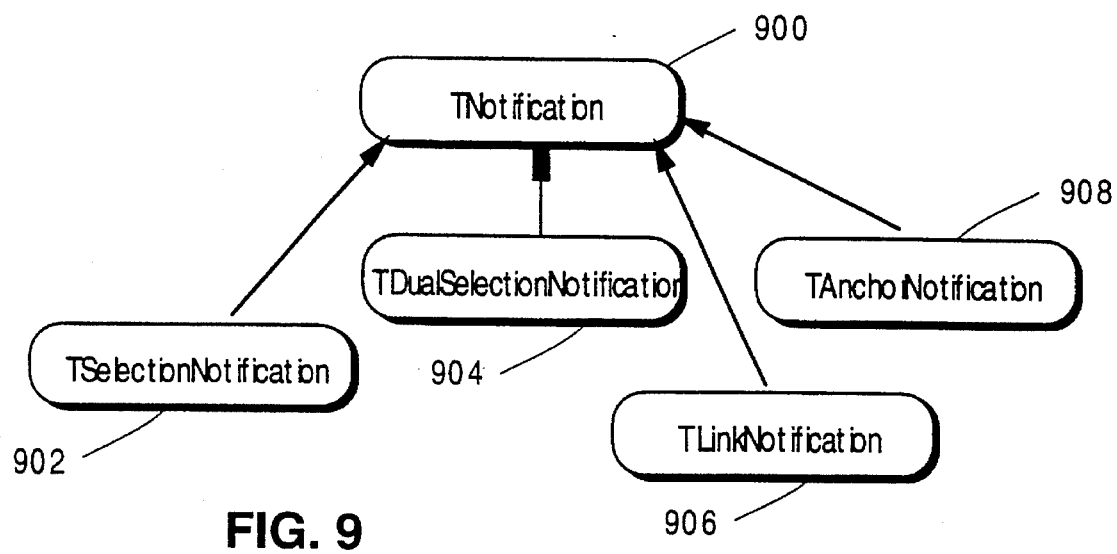
FIG. 9 is a diagram of a notification framework which could be used with the document framework system.

FIG. 9 sets out the notification system for the document framework. The document framework provides change notification to clients of TModels (clients are typically presentation views) on all changes made to the data contained in a model. A presentation can connect to a model for notification on specific changes, or all changes, to a model's data. By performing the proper updates to the presentation when the notifications are received, the presentation remains synchronized with the underlying data. TModel provides notifications for changes to the data it manages, specifically anchors & links, via TLinkNotification 906 and TAnchorNotification 908, and selections, via TSelectionNotification 902. Standard notifications are also provided for Cut/Copy/Paste operations (not explicitly shown). Other notifications relative to the document framework are also contemplated. For example, TDualSelectionNotification provides notification of dual selections. It is the responsibility of a subclass of TModel to provide notifications specific to that model's data. The notifications must be sufficient for presentations to remain consistent with the underlying data.

Data Specification

In the document framework the class that supports the specification of document data is TModelSelection. It is important to note that model selections are truly specifications of the selected data, and do not actually contain the data. Furthermore, the specification must identify the data in an address independent way, so that selections can be applied in multiple collaborator's address spaces. The document framework manages data at the granularity of whole models and provides default functionality that operates on whole models. TModelSelection is no exception. TModelSelection provides protocol and implementation for specifying the selected model. Typically an implementation of a derived class of TModel will provide a corresponding derived class of TModelSelection which supports specification of the data contained within the model at a finer grain than the whole model. This allows commands to be applied to a subset of the data in a model, rather than the entire model.

Data Exchange

Figure 10:
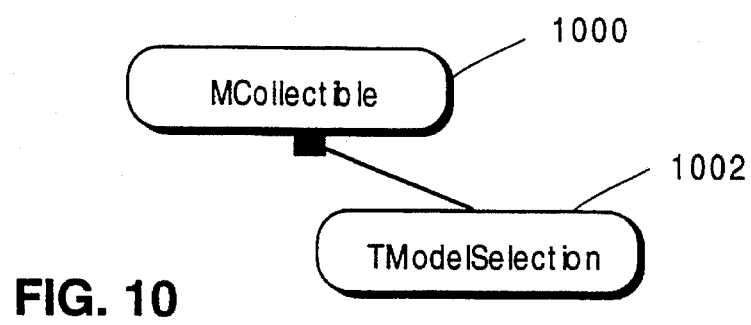
FIG. 10 is a diagram of the relationship defining specification classes.

FIG. 10 shows the specification classes, which include TModelSelection 1002 and MCollectible 1000. TModelSelection 1002 defines protocol for the exchange of data between selection objects. This protocol is used by a number of standard commands provided by the document framework. These include, Cut, Copy, Paste, Push and Pull commands. TModelSelection 1002 provides the protocol for negotiating data types for exchange between selections. A source selection produces a list of model types in which it can produce the selected data. The destination selection chooses the type of model in which it prefers to receive the data and how it will receive it (absorb or embed). After a type has been selected via the type negotiation process, the source selection is asked for a copy of the data in the chosen type by calling CopyData. The model returned is then passed to the destination selection in AbsorbData or EmbedData depending on how the selection indicated it would receive the data in the type negotiation. The negotiation may occur across document teams when exchanging data between anchors. In this case services of TRemoteDocument are used to access remote information. The entire exchange process described above is typically carried out by a command object such as TPasteCommand or TPushDataCommand.

TModelSelection

The class, TModelSelection 1002, provides most of the protocol that document selections and anchors (persistent selections) are expected to implement. It serves as the base class for all selection objects. TModelSelection objects contain the protocol for exchanging data between selections using cut, copy, and paste or using push/pull (on anchors). This includes the protocol for type negotiation (what types can I publish this data in, what types can I accept data in) and the protocol for accepting or publishing data in a specified type.

Member functions CreatePreferredTypeList, ChoosePreferredType, and GetTypeAcceptKind are inherited from MTypeNegotiator and support type negotiation for exchange of data between selections. Member functions are also provided for supporting adding, removing, and creating anchors to the selection. Member functions are also provided to support the exchange of their associated model's specific type of data. The subclass does not need to concern itself with the copying of anchors and links. This is handled by TModelSelection automatically. Member functions are also provided to override if anchors must be adjusted when imported or export (e.g. anchors in text must be adjusted to be relative to the exported data when exported and to the containing context when imported).

Data Modification

Figure 11:
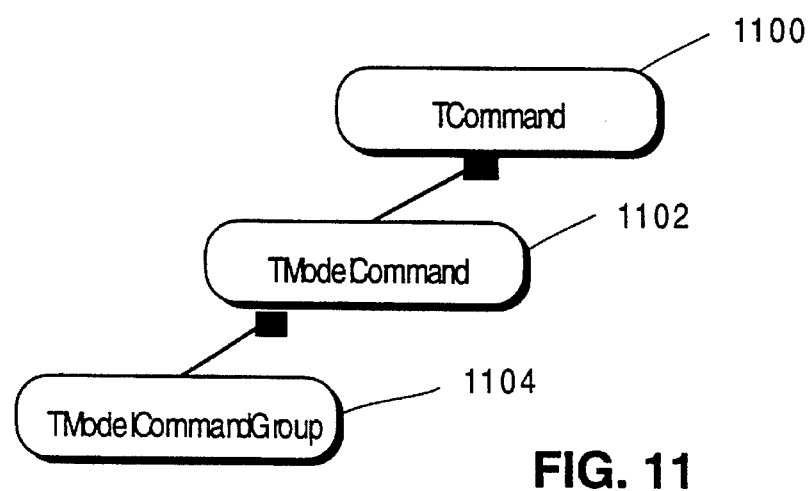
FIG. 11 is a diagram of the relationships associated with TModel Command Group.

FIG. 11 shows the basic relationships necessary for carrying out data modification. TModelCommandGroup 1104, TModelCommand 1102, and TCommand 1100 each cooperate to provide the necessary modifications required within the system.

Modification Classes

In the document framework the abstract base class that represents a command made by the user is TModelCommand 1102. Subclasses of TModelCommand 1102 encapsulate the semantics of a user action and can change model based on the user action. Command objects can be "done", "undone", and "redone", and are typically independent of the user interface technique used to create them.

TModelCommand 1102

TModelCommand 1102 is a derived class of the TCommand 1100 class. TModelCommand 1102 objects encapsulate a user action which changes the model. TModelCommands have protocol for: Doing, undoing and redoing the change to the model, Identifying the collaborator who issued the command, and Doing the change incrementally, as when dragging or typing.

TModelCommand objects 1102 typically operate on a selection which may be part of the command object or more typically the current document selection. The base class, TModelCommand 1102, provides the protocol that all model command objects respond to. Subclasses override the "HandleXXX" methods to provide specific behavior.

Some TModelCommands are intended to be executed incrementally. These commands are used to allow the user to incrementally modify a model. These commands are called repeating commands. One example of a repeating command is a shape dragging command for a drawing program. Even though a tracking command might force the model to go through many intermediate states, it counts as a single command. The means that the entire effect of the command is undone and redone as a single atomic action.

The document framework uses the concept of a command object in its framework for Undo. Command objects are also central to the collaboration features of the document framework.

Model Based Tracking Details

Figure 12:
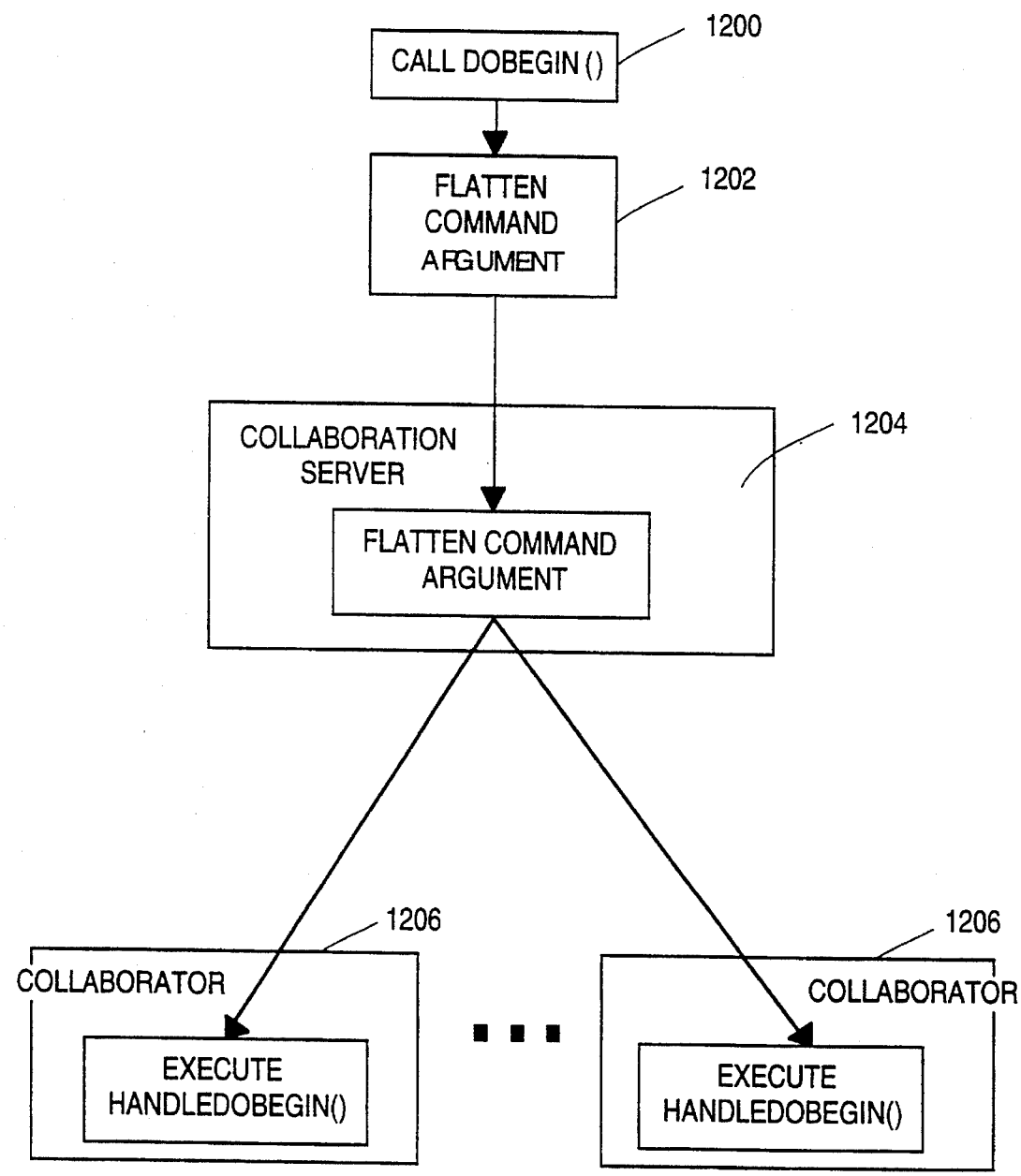
FIG. 12 is a diagram demonstrating the processing flow for DoBegin()

FIG. 12 shows a diagrammatic representation of a possible processing flow for carrying out a part of the tracking operations in the document flamework. As indicated by 1200, when the tracker calls DoBegin() the command argument is flattened 1202 and sent to the collaboration server, at 1204. From there it is flattened again and sent to each of the collaborators. At each collaborator the command's HandleDoBegin() method is executed, as indicated at 1206.

Figure 13:
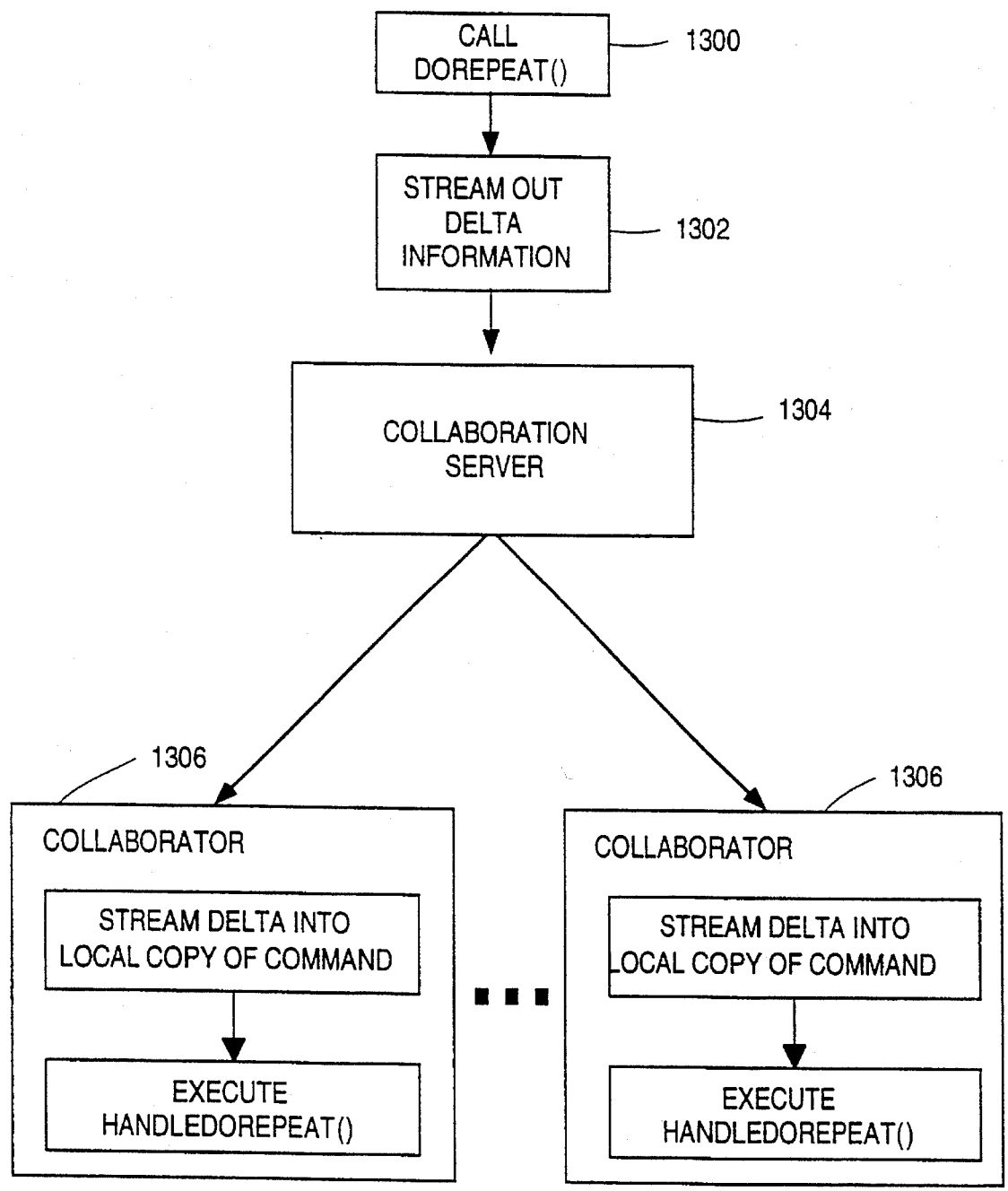
FIG. 13 is a diagram demonstrating the processing flow for DoRepeat()

FIG. 13 shows a diagrammatic representation of a possible processing flow for carrying out another part of the tracking operations in the document framework. When the tracker calls DoRepeat(), as indicated by 1300, the command argument is asked to stream out the delta information 1302. The command delta is sent to the collaboration server, at 1304. From there the delta is sent to each of the collaborators. At each collaborator the delta is streamed into the local copy of the command, as indicated by 1306. Then the command's HandleDoRepeat() method is executed.

When the tracker calls DoEnd() similar operations as those shown with respect to FIG. 13 are performed. The command argument is asked to stream out the delta information. The command delta is sent to the collaboration server. From there the delta is sent to each of the collaborators. At each collaborator the delta is streamed into the local copy of the command. Then the command's HandleDoEnd() method is executed. There are two ways an incremental command can finish its extended Do phase. The standard way is for DoEnd() to be called. The other way is for the collaborator who is doing the tracking to unexpectedly leave the collaboration. In that case the command on the collaboration server has it's HandleCollaboratorDied() method called. After the extended Do phase is finished, the command is expected to be in the same state as if it's HandleDo() method was called.

TModelCommandGroup:

TModelCommandGroup is a subclass for TModelCommand which allows complex commands to be easily built from several simple commands. TModelCommandGroup delegates most methods (e.g. HandleDo) to each of the commands in the group. The commands are not truly serialized, in that HandleLocalDo is called for all commands, and then HandleDo is called for all commands. If the HandleLocalDo of a command relies on state set by an earlier command's HandleDo, this will not work.

The following member functions support the management of commands contained in the command group: AdoptFirst, AdoptLast, Orphan, OrphanAll.

Standard Commands

The following commands are all standard commands provided by the document framework.

TSelectCommand:

The TSelectCommand should be issued when changing selections. TSelectCommand is an incremental command supporting direct manipulation for selection. This command sets the selection for the collaboration initiating the command and does not affect other collaborator's selections.

TCutCommand:

The TCutCommand has the local effect of cutting the current selection out of the document. It has the global effect of adding something to the clipboard. The local effect is accomplished by subclassing TReplaceSelection command.

TCopyCommand:

The TCopyCommand has no local effect. It has the global effect of putting something on the clipboard.

TPasteCommand:

The TPasteCommand replaces the current selection with the data on the clipboard. This is accomplished by subclassing TReplaceSelection command.

TReplaceSelectionCommand:

The TReplaceSelectionCommand replaces the data specified by a selection or anchor with data encapsulated in the command object. The command object contains a TModel which is used to replace the selection's data. You will typically never create a TReplaceSelectionCommand yourself. The document framework use this command object in cut, paste, push, pull, etc.

TNewAnchorCommand:

The TNewAnchorCommand is issued whenever a new anchor is created. A TStartLinkCommand acts as a TNewAnchorCommand after the global effect of TStartLink is done.

TNewLinkCommand:

The TNewLinkCommand is issued whenever a new link is created. A TCompleteLinkCommand subclasses TModelCommandGroup with TNewLinkCommands embedded in it.

TStartLinkCommand:

The TStartLinkCommand has the global effect of putting a new anchor on the "link board" and the local effect of adding a new anchor to the document. The local effect is accomplished by subclassing TNewAnchorCommand.

TCompleteLinkCommand:

The TCompleteLinkCommand has to do a lot of work. It has the (possibly) non-local effect of posting a new link command to another document (the document which issued the start link command). It has the local effect of adding an anchor and a link to the current document. This is accomplished using the appropriate command objects (TNewAnchor and TNewLink) in its implementation.

TPushDataCommand:

The TPushDataCommand has the (possibly) non-local effect of posting a TPushedData command to the destination anchor. All type negotiation is handled via the selection protocol.

TPullDataCommand:

The TPullDataCommand command could be called the pull command. It retrieves data from an anchor at the other end of a link.

TFollowCommand:

The TFollowCommand will "follow" a link. This involves posting a TFollowedCommand to the document containing the other side of the link.

TFollowedCommand:

The TFollowedCommand is posted to the document containing the destination anchor in a link. The "there" side of the TModelLink embedded in the TFollowedCommand is the destination anchor. The Follow method of the destination anchor will be called. Override this method to implement the proper follow behavior (typically scroll the anchor and its selection into view).

Anchors & Links

Figure 14:
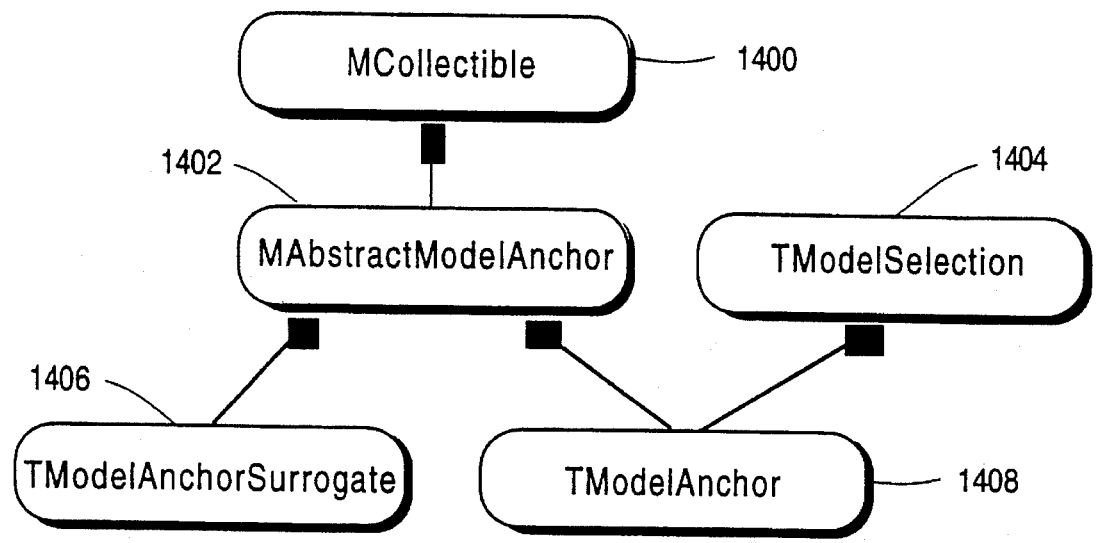
FIG. 14 is a diagram showing the relationships established for TModelAnchor.

FIG. 14 demonstrates the relationships between MCollectible 1400, MAbstractModeler 1102, TModelSelection 1404, TModelAnchorSurrogate 1106, and TModelAnchor 1408.

Figure 15:
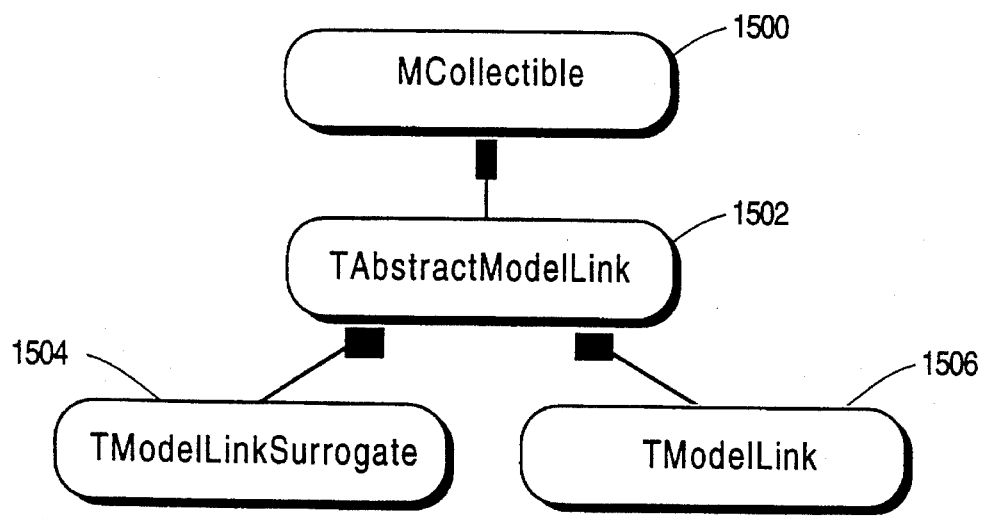
FIG. 15 shows the relationships established for TModelLink.

FIG. 15 demonstrates the relationships among MCollectible 1500, TAbstractModelLink 1502, TModelLinkSurrogate 1504, and TModelLink 1506.

Anchor and Link Classes

Anchors are typically "sticky" document selections. Sticky means that the data selected by the anchor is constant across editing changes in a model.

Links are connections between two anchors. Operations on links include creating them, removing them, "following" them, pushing data from one sticky selection to the other, or pulling data. To create a link between two anchors, the user must specify the anchors. The situation is similar to copying and pasting data (the user needs to specify a source and destination), so one way to do this is to maintain a kind of "linkboard," analogous to the clipboard.

Figure 16:
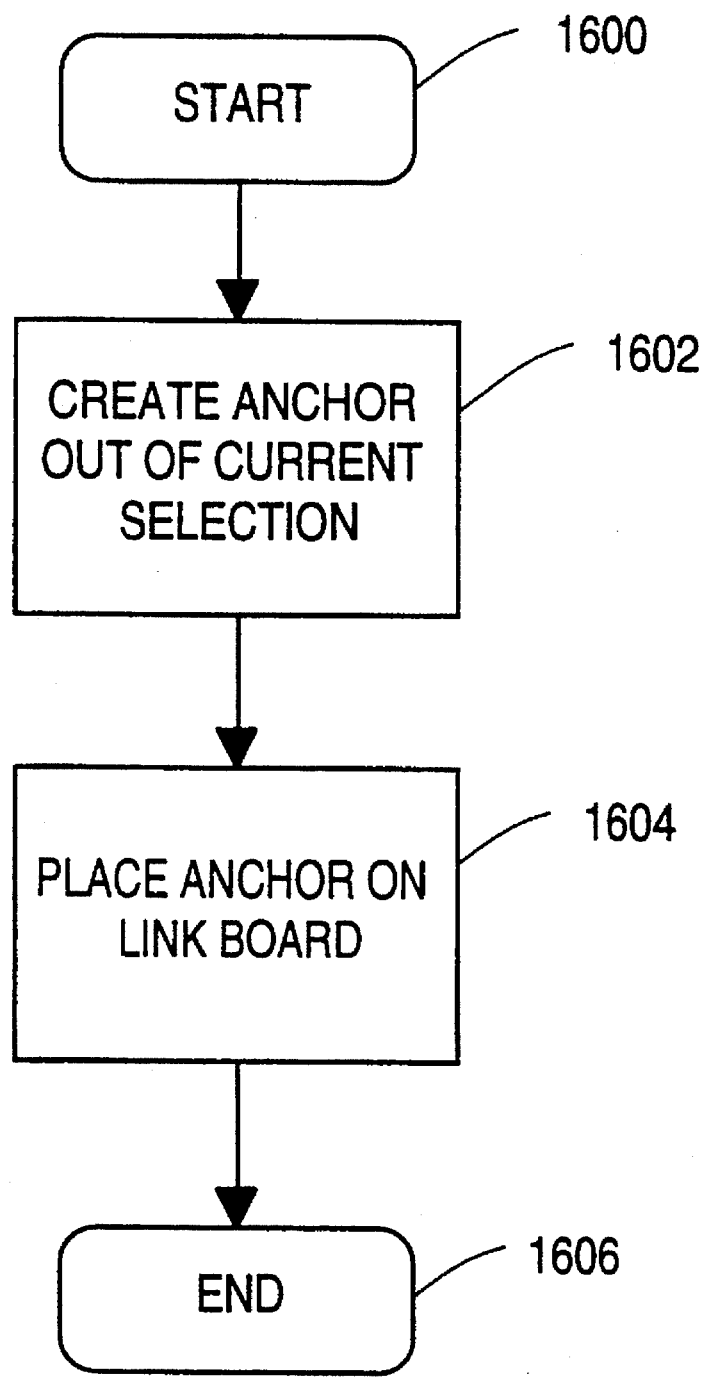
FIG. 16 is a diagram depicting the processing of links.

FIG. 16, between 1600 and 1606, shows the Start Link command processing flow. The Start Link command would create an anchor out of the current selection at 1602 and place the anchor on the linkboard at 1604.

Figure 17:
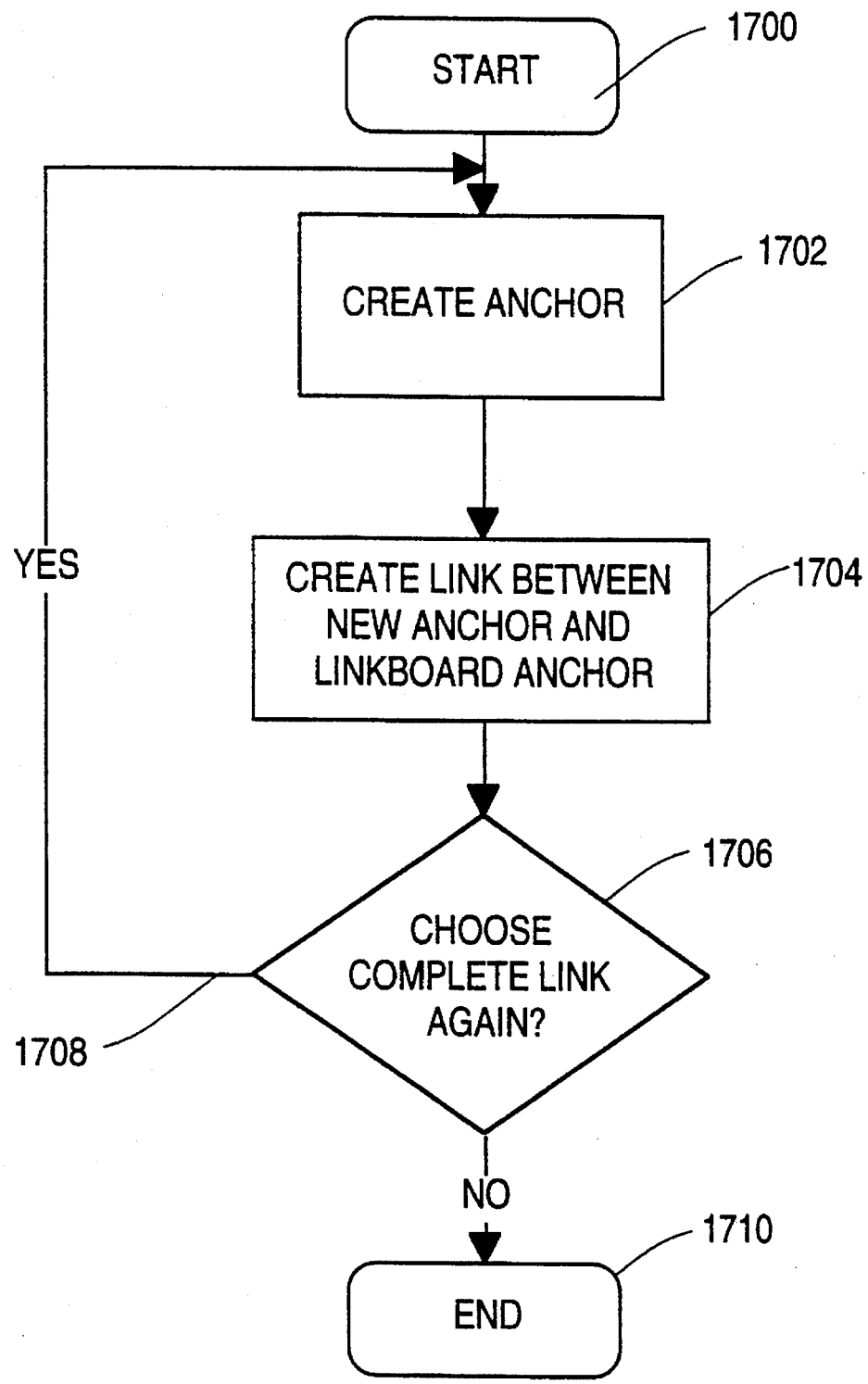
FIG. 17 shows the processing of Complete Link.

FIG. 17, between 1700 and 1710, shows processing flow of The Complete Link command. The Complete Link command would also create an anchor at 1702, and then create a link between the new anchor and the one on the linkboard at 1704. It is possible to choose Complete Link at 1706 several times, in order to create several links that share a common anchor, as indicated by the processing flow 1708.

Figure 18:
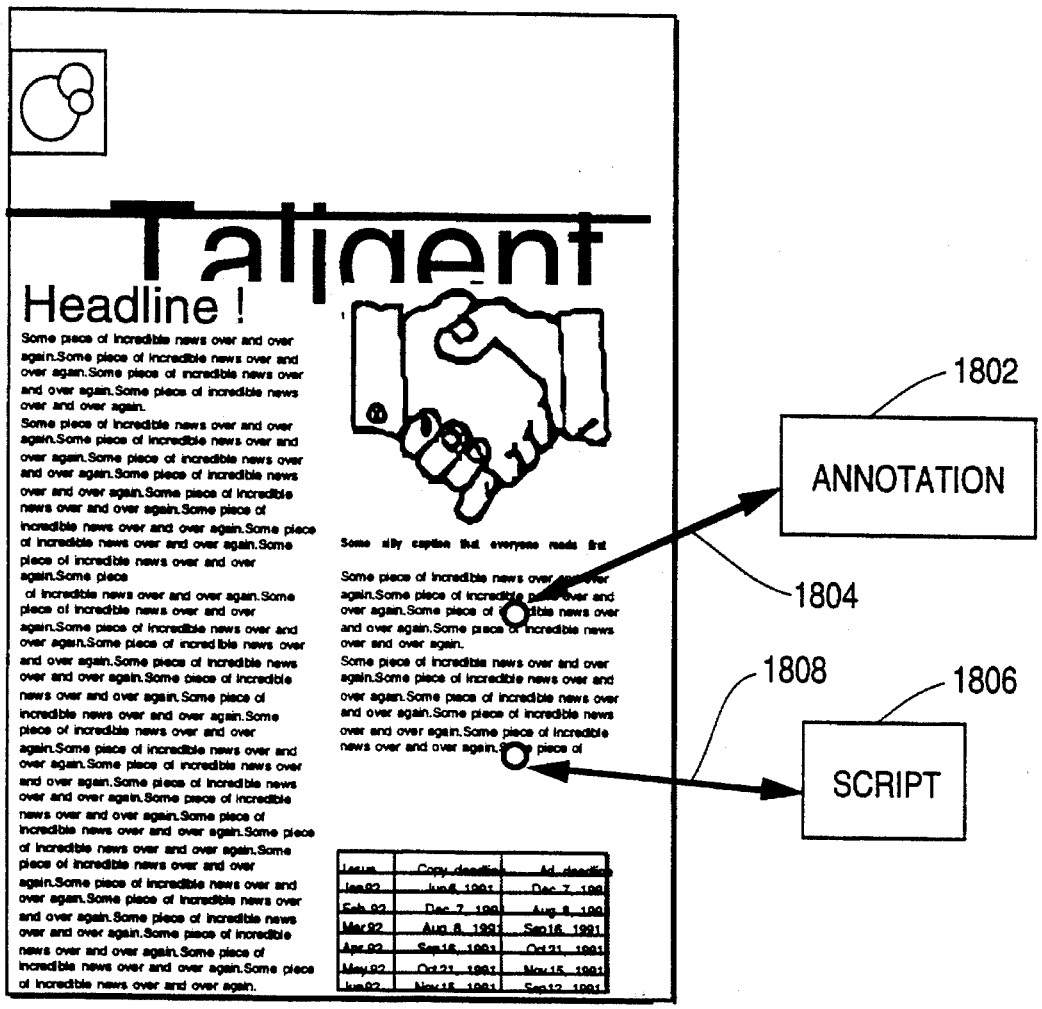
FIG. 18 demonstrates the use of annotations and scripts being linked to a document.

FIG. 18 demonstrates links in a document 1800 which have been created by an application programmatically. We expect that most of the "interesting" uses of linking will fall into this category. For example, annotations 1802 can be attached to the affected parts of the document with links 1804. Scripts 1806 can also refer to parts of a document with links 1808. It should be noted that the links of FIG. 18 are merely representative of software structures and are not intended to convey any particular visual characteristics of links, scripts, annotations, or the document portions linked to. There is only one kind of link in the document framework. It is bi-directional, as indicated by the bidirectional links 1804 and 1808, and supports both navigation (finding the other end of the link) and data transfer.

Figure 19:
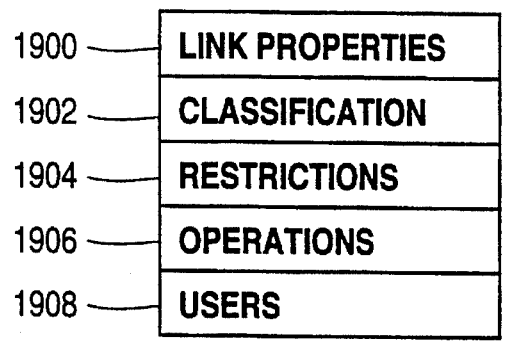
FIG. 19 shows some of the link properties which are available in the system.

FIG. 19 demonstrates some of the characteristics of links. Links also have properties 1900, which applications can use to classify 1902 links and to restrict 1904 how links are used. For example, there could be properties that specify what the user 1908 can do 1906 with a link. It might be desirable to allow certain users only to pull data from a spreadsheet and not navigate to the spreadsheet or push data into it. Links that are used to implement annotations will be identified by a certain property. This property will indicate that the link is part of an annotation, and that the appropriate annotation commands are enabled.

A final example is a link that indicates a master-copy relationship. This would be used for import data. Instead of copying and pasting a static representation of a graph, the user can create a link between the original graph and the copy placed in the word processor document.

TModelAnchorSurrogate

TModelAnchorSurrogate, shown in FIG. 14 as element 1406, is the surrogate class for TModelAnchor 1408. It provides a subset of the protocol available from TModelAnchor 1408. Specifically it provides protocol for supporting data exchange between anchors. By using the protocol of the surrogate, the client does not need to distinguish between anchors in the local document or a remote document. TModelAnchor 1408 maintain a list of attributes which describes attributes of the link such as what operations may be performed (e.g. push, pull). Attributes are managed as a simple attribute group. Protocol is provided for adding, removing and looking up attributes. TModelAnchors 1408 are owned by their creator and it is the creator's responsibility to delete them unless ownership has been passed to another object like a TModel. Important member functions are: CreatePreferredTypeList, ChoosePreferredType and CopyData.

TModelAnchor

TModelAnchor, shown in FIG. 14 as element 1408, is the base class for all persistent selections which serve as anchors for hyperlinks. The default implementation of TModelAnchor 1408 contains a TModelSelection 1104 to which it delegates all TModelSelection calls. TModelAnchor 1408 maintain a list of attributes which describes attributes of the link such as what operations may be performed (e.g. push, pull). Attributes are managed as a simple attribute group. Protocol is provided for adding, removing and looking up attributes. Important functions are: SetSelection, Follow, Execute, AddAttribute, scripting, automated testing and AdoptLink.

TModelLink

The TModelLink class, shown in FIG. 15 as element 1506, provides the representation for a link. Specialization is accomplished by subclassing TModelAnchor. There are no subclasses of TModelLink 1506. The "here" anchor and the "there" anchor are just names for the two anchors in a link.

The "here" anchor in a TModelLink 1506 is typically part of the current document and can be turned into a real anchor using a method of the TModel. The "there" anchor may be part of the current document or could belong to another document.

TModelLinks 1506 also maintain a list of properties which describes attributes of the link such as what operations may be performed (e.g. push, pull). Properties are managed as a dictionary of property names and values. Protocol is provided for adding, removing and looking up properties. Important member functions are: GetHere, GetThere, AddAttribute and RemoveAttribute.

TDynamicModelAnchor

TDynamicModelAnchor is the base class for anchors whose data specification is dynamic rather than static. The anchors are call "dynamic" because they may specify different document data each time they are accessed. Normal anchors always refer to the same data in the document. For example, a dynamic anchor could represent the current selection in the document. When data was pushed from the anchor it would be the data represented by the current selection at that moment.

Document Control & Communication

The classes in this section are included here to give the reader an idea how documents use the process model. The class TDocument is created to start a document in a team. It is responsible for creating the various frameworks and services necessary for local control of a document team. This includes starting servers for collaboration and external document control, and providing control of the document filing operations. The class TRemoteDocument provides a remote interface to documents in other teams. It allows data to be accessed from documents in other teams, and supports control of those documents through commands.

Model Filing

TDocument provides support for initiating filing operations on a document. When filing in a model, there is no real work to be done. TModels are filed in automatically when they are first requested from a surrogate. A model may be deleted from memory at any time by the container if desired. Of course, an exclusive lock on the model must be acquired to delete it, and no pointers to the model should be cached and held beyond the duration of a lock on the model. Model surrogates may cache model pointers, but this will be transparent to clients.

For filing out there is a larger role. In order to support a saveless model and maintain storage consistency, the document framework logs commands on all models in a store to that store. Models cannot be written individually, but rather, all dirty models are always written together. This simplifies handling of the command log, by allowing the entire command log to be removed from each store whenever models are written. The models are written when the document is closed, but also on a periodic basis while the document is open, to reduce the restart time for a document in case of a system failure.

Inter-document Communication

Figure 20:
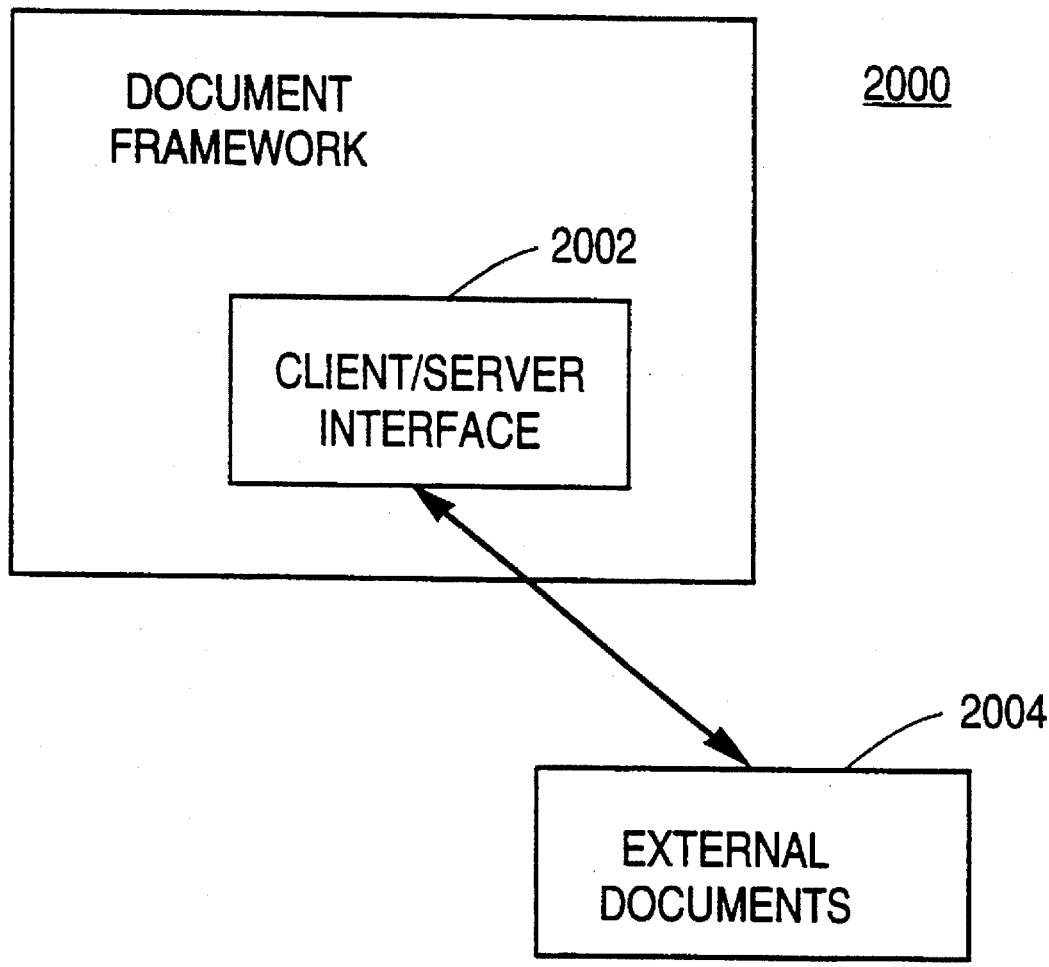
FIG. 20 shows the document framework client/server with respect to external documents.

In the document framework, each document runs in its own team. Documents must be able to communicate with one another to support many of the standard features of the document framework. For example hyper-text linking allows data to be pushed and pulled across documents, and links to be followed across documents. To accomplish this processing, as shown in FIG. 20, the document framework 1700 provides a client/server interface 2002 for external documents 2004. To communicate with an external document, a TRemoteDocument is created from a surrogate for the root model of the document. The TRemoteDocument object may be used to open, send commands, query links, etc.

Document Startup

A new team must be created for each new document started. Although an "application" can be written which creates a document with a specific root type, this is not necessary. The document framework will use the capabilities provided by the runtime system in TTaskProgram, to create and start the appropriate objects in the document team. A document is started by creating a TRemoteDocument with the surrogate for the root model of the document, and then making a request of the document, typically to open. This will start the document team and open the requested document using the surrogate provided. Other requests may be made of the document which do not require opening a user interface on the document (i.e. copying selected data from an anchor).

TDocument

The TDocument class acts as the controller for the document data. It creates the frameworks and servers necessary for a document team. It also provides control of the filing process. TDocument is instantiated automatically by TModelApplication when a document is started. Important member functions are: SetSelection, GetSelection.

TRemoteDocument

This class provides access to a document in another team. This is the only way for two documents to interact for purposes of Cut/Copy, Paste, Linking, etc. because only a single document can operate in a team. It allows the document to be controlled externally. Typical uses include, link navigation & data transfer, opening/closing, etc. The following member function supports doing commands on remote documents (documents in another team): Do.

The following member functions support data exchange with anchors in remote documents: CreatePreferredTypeList, ChoosePreferredType, CopyAnchorData and NotifyLink. The following member functions support opening and closing user interfaces on a remote document: Open, Close and IsOpen. The following member functions support receiving notification on opening and closing of documents: CreateOpenInterest and CreateCloseInterest.

Figure 21:
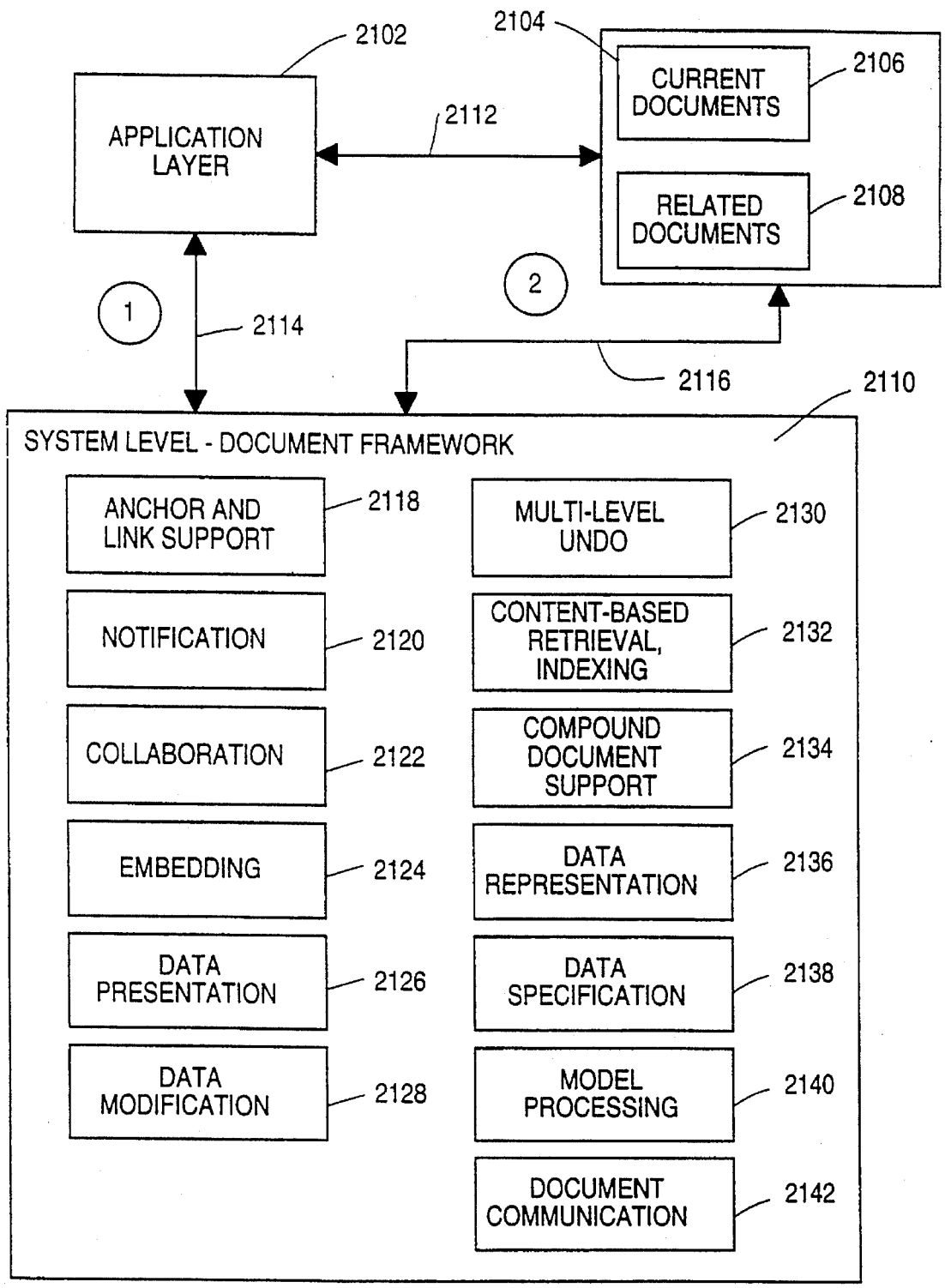
FIG. 21 is a block diagram showing the method and system of the present invention.

FIG. 21 shows the overall system design of the present system and method. The application layer 2102 interacts with the current 2106 and related 2108 documents in storage 2104 via flow 2112. The application layer 2102 also interacts with the system level document framework 2110 of the present invention via flow 2114, indicated by the circled 1. And finally, the document framework 2110 of the present invention interacts with the current 2106 and related 2108 documents in storage 2104 via flow 2116, indicated by the circled 2.

The particulars of the document framework 2110 have been discussed in detail above. The document framework 2110 is a collection of objects for Anchor and Link Support 2118, Notification 2120, Collaboration 2122, Embedding 2124, Data Presentation 2126, Data Modification 2128, Multi-Level Undo 2130, Content-Based Retrieval and Indexing 2132, Compound Document Support 2134, Data Representation 2136, Data Specification 2138, Model Processing 2140 and Document Communication 2142. As previously discussed, while many of the objects find particular inventiveness by being placed at the system level, and providing functions in conjunction with the other objects at the system level, it should also be understood that certain of the objects may also be considered at other levels of the system.

StockTicker Example

An example of a real life application may assist in clarifying the practical application of the subject technology. First, to set the stage, a review of the compound document technology. A model is something that holds data and makes it available to facilities that access, modify, and present the data to users. A presentation is a facility that provides a user with a view onto a model for reading and editing. A clipboard is a special model associated with a user's environment containing a model that is on the clipboard in the cut/copy-paste operation.

The application implements a stock ticker which emulates the stock tickers found in Merrill Lynch offices around the country. The stock ticker presents current stock prices for various stocks traded on the New York Stock Exchange. It receives as input current stock prices from a database residing ultimately at the stock exchange in New York City. The communication link is well known in the art and could for example be an asynchronous serial communication link transmitting ASCII characters. The ASCII characters are displayed directly on a display using any number of fonts encoded to synchronize with ASCII 8-bit characters. The display mechanism will be referred to as a view and could be any number of common window or other display mechanisms that are also well know in the art. A clipboard model contains a model that is a StockTicker instance. The StockTicker instance refers to communication and display information ready for simulating a stock display. A destination model is going to receive the StockTicker instance in a paste operation to show how a preferred embodiment can be used to enable a compound documents with diverse information.

The destination model is part of a document; it could either be the model for the "root" model of the document or it could be an embedded model. A paste command is issued on the destination document. The command includes two specifications: 1) a reference to the source model on the clipboard that is to be copied, and 2) a specification of a location in the destination document that it should be pasted into. The paste command operation involves the following steps. First, a type negotiation interaction between the destination model and source model. The source provides a list of types that it can provide and the destination selects a preferred type. In this case, the destination does not recognize the specific StockTicker data type so it accepts it abstractly as a model and embeds it. The destination side gets a new copy of the StockTicker model, and it is adopted into the destination model. The destination model has been modified, so it sends a change notification message to all presentations opened on it. Each presentation receives the notification and re-synchronizes its state with the new model state that includes the new StockTicker. For instance, the presentation could be done by completely regenerating its state from the new model state. A more optimized model-presentation relationship might involve a more special notification that tells the presentation precisely what changed so that the presentation can update only what changed. The outcome is that presentation queries the StockTicker model to generate a presentation of itself. This is a complex operation that is detailed below.

When the StockTicker model responds by constructing a presentation view instance, the constructor of this StockTicker view subclass performs the following steps. It creates a thread owned by the view subclass and starts it. The thread enters a function that performs the following steps. It prepares windowing and graphic facilities for displaying continuously updating and animating graphics to the StockTicker presentation view. A specific example of this is a "graphics port" facility that is a conduit for graphics drawn by this thread onto the presentation view. Then it goes into a loop which draws an animating presentation of the data and queries the stock data as needed. The properly constructed StockTicker presentation view is then adopted as a subview of the outer presentation, or more generally, it is wrapped inside an intermediate view that supports facilities for managing embedded entity as a whole.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for document processing for use in a computer system having a processor, a storage and a display under control of the processor, the apparatus comprising:

(a) a document framework stored in the storage, the document framework defining a plurality of model classes, each one of the plurality of model classes defining means for referencing data stored in the storage, means for creating a container object to hold a plurality of objects instantiated from one or more of the plurality of model classes and program logic means for processing the data and objects held in the container object;

(b) means for instantiating a root model object from one of the plurality of model classes, the root model object containing a reference to data of a first type;

(c) means for instantiating a plurality of additionally model objects from the plurality of model classes, each one of the plurality of additional model objects containing a reference to data of a type different from the first type;

(d) means for creating a compound document from the root model object by adding at least one additional model object instantiated from the plurality of additional model objects to a container in the root model object, wherein the root model object and each one of the at least one additional model objects provide a hierarchy of model objects which represent a containership hierarchy of the compound document; and (e) means for processing the compound document by processing the root model object, which applies the processing to the at least one additional model object in the container in the root model object.

2. The apparatus of claim 1, wherein the document framework stored in the storage includes means for streaming, wherein in response to a first model being streamed, the means for streaming streams the first model and each of a plurality of embedded models contained within the first model.

3. The apparatus of claim 2, further comprising means for copying, wherein in response to a first one of an entire model or a selected data from a model being copied, the means for copying copies each of a plurality of embedded models contained with the first one of the entire model or the selected data from a model.

4. The apparatus of claim, further comprising means for filing a model, wherein in response to first model being filed, the means for filing files a plurality of embedded models contained within the first model and wherein means for filing files each of the plurality of embedded models independently from the first model in which the plurality of embedded models are contained.

5. The apparatus of claim 4 wherein the document framework comprises:
   means for specifying a plurality of anchors;
   means for linking a first anchor;
   means for transferring information across links in first and second opposite directions wherein the means for transferring information across links includes:
     means for initiating a transfer of information from either end of a link;
     means for transferring document information across links.

6. The apparatus of claim 1, wherein the document framework includes means for stacking one or more commands; and means for undoing the commands.

7. The apparatus of claim 6, wherein the means for undoing commands includes means for undoing commands in an order opposite from which the commands were stacked.

8. The apparatus of claim 6, wherein the means for undoing commands includes means for selectively undoing commands in an order unrelated to an order in which the commands were stacked.

9. The apparatus of claim 1, wherein the document framework includes means for managing embedded models.

10. The apparatus of claim 1, wherein the document framework includes means for providing notification.

11. The apparatus of claim 1, wherein the document framework includes means for creating complex command groups.

12. The apparatus of claim 1, wherein the document framework includes hierarchical document support means for embedded data.

13. The apparatus of claim 12, wherein the hierarchical document support means includes means for embedding data in a model.

14. The apparatus of claim 13, wherein the means for embedding includes means for overriding protocols associated with the embedded data.

15. The apparatus of claim 1, wherein the document framework includes annotation means for providing additional information with respect to document data.

16. The apparatus of claim 1, wherein the document framework includes retrieval framework means for providing indexing and query processing.

17. The apparatus of claim 16, wherein the retrieval framework means includes background indexing.

18. The apparatus of claim 1, wherein the document framework includes object surrogate means for providing address space independent references to real objects.

19. The apparatus of claim 1, wherein the document framework includes means for seamlessly integrating audio and visual information in a compound document.

20. A method for document processing for use in a computer system having a processor, storage and a display under control of the processor, the method comprising the steps of:

(a) storing a plurality of model classes in the storage, each one of the plurality of model classes defining referencing data stored in the storage;

(b) creating a container object to hold a plurality of objects instantiated from one or more of the plurality of model classes (c) creating logic for processing the data and objects held in the container object;

(d) instantiating a root model object from one of the plurality of model classes, the root model object containing a reference to data of a first type;

(e) instantiating a plurality of additional model objects from the plurality of model classes each one of the plurality of additional model objects containing a reference to data of a type different from the first type;

(f) adding at least one of the additional model objects to a container in the root model object to provide a compound document from the root model object; and (g) processing the compound document by processing the root model object, which applies the processing to the at least one additional model object in the container in the root model object.

21. The method of claim 20, including the step of streaming a first model and each of a plurality of embedded models contained within the first model.

22. The method of claim 21, including the step of copying a model and each of a plurality of embedded models contained with the model.

23. The method of claim 21, including the step of filing a first model, wherein in response to the first model being filed, the step of filing a first model includes the steps of:
   filing a plurality of embedded models contained within the first model; and
   filing each of the plurality of embedded models independently from the first model in which the plurality of embedded models are contained.

24. The method of claim 21, including the steps of:
   establishing at least one link between a first anchor and a second anchor;
   initiating a transfer of information from the at least one link;
   transferring information across the at least one link in a first direction;
   initiating a transfer of information from a second different end of at least one link; and
   transferring information across the at least on link in a second opposite direction.

25. The method of claim 20, including the step of containing document data.

26. The method of claim 25, including the step of modifying the data.

27. The method of claim 20, including the step of stacking one or more commands; and undoing the commands.

28. The method of claim 27, including the step of undoing commands in an order opposite from which the commands were requested.

29. The method of claim 20, including the step of selectively undoing commands in an order other than the order in which the commands were requested.

30. The method of claim 20, including the step of supporting hierarchical document data including embedded data.

31. The method of claim 30, including the step of embedding data in a model.

32. The method of claim 31, including the step of overriding protocols associated with the embedded data.

33. The method of claim 20, including the step of annotating for providing additional information with respect to document data.

34. The method of claim 20, including the step of indexing and query processing using a retrieval framework.

35. The method of claim 34, including the step of background indexing.

36. The method of claim 20, including the step of providing address space independent references to real objects using object surrogate means.

37. The method of claim 20, including the step of seamlessly integrating audio or visual data into a compound document.

38. The method of claim 20, including the step of sharing access to a single document by two or more users utilizing command-based-collaboration.

39. The method of claim 38, including the step of sharing access to a single document via a communication link utilizing remote command execution.

* * * * *